UNITED STATES PATENT OFFICE.

FREDERIC A. EUSTIS, OF MILTON, MASSACHUSETTS, ASSIGNOR OF THREE-FOURTHS TO CHARLES PAGE PERIN, OF NEW YORK, N. Y.

METHOD OF TREATING IRON ORE FOR THE RECOVERY OF CHROMIUM.

1,403,237.  Specification of Letters Patent.  Patented Jan. 10, 1922.

No Drawing. Original application filed April 26, 1919, Serial No. 377,006. Divided and this application filed June 12, 1920. Serial No. 388,521.

*To all whom it may concern:*

Be it known that I, FREDERIC A. EUSTIS, a citizen of the United States of America, and resident of Milton, in the county of Norfolk and State of Massachusetts, have invented new and useful Improvements in Methods of Treating Iron Ore for the Recovery of Chromium, of which the following is a specification.

This invention relates to the treatment of iron ore, and particularly fine iron ore containing chromium with or without other incidental metals such as aluminum, manganese and nickel. The principal object of the present invention is to recover chromium from the ore. This application is a division of an application for Letters Patent for the treatment of iron ores filed by me April 26, 1919, Serial No. 377,006.

The invention is well adapted to the treatment of such ores as the soft iron ores of the north coast of the Island of Cuba, which occur as blanket deposits on top of the rocks forming that part of the island. The ores consist essentially of oxides and silicates of iron and aluminum, and contain also small amounts of nickel, manganese and chromium together with much water. Such ores have the advantage for the present process that they do not have to be ground. But the process is also applicable to other fine ores, as well as said Cuban ores, whether they are fine in nature or are made fine by grinding. Such ores, as the Cuban ores can be treated by the present method without roasting. If, however, the ore does not yield readily to the solvent it may be given a preliminary suitable roast to make the iron and other incidental metals aluminum, manganese and nickel, if present, readily soluble, leaving the chromium insoluble.

The finely divided ore is first leached in a suitable lixiviating vat. The solution used is preferably a weak solution of hydrochloric acid, or a mixture of hydrochloric acid and sulphuric acid, but other suitable solvents may be used, preferably of a kind which will act as an electrolyte at a later stage of the process of treating the leach liquor as described in my said application Serial No. 377,006.

The leaching step yields on the one hand a liquor containing in solution iron salts and also aluminum salts, and nickel and manganese if the latter metals were present in the ore; and on the other hand a residue consisting of substantially all the silica and substantially all the chromium together with small amounts of undissolved iron and small amounts of the other metals if present.

The liquor is suitable for treatment in the manner described in my said application Serial No. 377,006, for obtaining electrolytic iron and other by-products as therein more fully set forth.

The residue, containing virtually all of the chromium approximately free from other metals, is admirably adapted for the recovery of chromium which may be done by known methods.

I claim:

1. The method of treating an iron ore containing chromium, which comprises dissolving out the major part of the iron leaving chromium as a residue.

2. The method of treating an iron ore containing chromium and other incidental metals, which comprises dissolving out the major part of the iron and other incidental metals leaving chromium as a residue.

3. The method of treating an iron ore containing chromium, which comprises dissolving out the major part of the iron leaving chromium and silica as a residue and thereafter recovering the chromium.

4. The method of treating an iron ore containing chromium and other incidental metals, which comprises dissolving out the major part of the iron and other incidental metals leaving chromium and silica as a residue and thereafter recovering the chromium.

5. The method of treating an iron ore containing chromium, which comprises dissolving out the major part of the iron with a solution containing chlorides, leaving chromium as a residue.

6. The method of treating an iron ore containing chromium, which comprises dissolving out the major part of the iron by means of a solvent which is also an electrolyte, leaving chromium as a residue.

Signed by me at Boston, Massachusetts, this ninth day of June, 1920.

FREDERIC A. EUSTIS.